US008558920B2

(12) United States Patent
Suehiro

(10) Patent No.: US 8,558,920 B2
(45) Date of Patent: Oct. 15, 2013

(54) IMAGE DISPLAY APPARATUS AND IMAGE DISPLAY METHOD FOR DISPLAYING THUMBNAILS IN VARIABLE SIZES ACCORDING TO IMPORTANCE DEGREES OF KEYWORDS

(75) Inventor: Masako Suehiro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 196 days.

(21) Appl. No.: 12/873,060

(22) Filed: Aug. 31, 2010

(65) Prior Publication Data

US 2011/0050726 A1   Mar. 3, 2011

(30) Foreign Application Priority Data

Sep. 1, 2009   (JP) ................................. 2009-201490

(51) Int. Cl.
*H04N 5/76* (2006.01)
*H04N 5/222* (2006.01)

(52) U.S. Cl.
USPC .................................. 348/231.2; 348/333.05

(58) Field of Classification Search
USPC ........................................... 348/231.2, 231.5
See application file for complete search history.

(56) References Cited

U.S. PATENT DOCUMENTS

| 4,639,773 | A  | * | 1/1987  | Hurst ............................. 348/700 |
| 5,886,745 | A  | * | 3/1999  | Muraji et al. .................. 348/448 |
| 6,370,543 | B2 | * | 4/2002  | Hoffert et al. ................. 725/113 |
| 6,538,698 | B1 | * | 3/2003  | Anderson ................. 348/333.05 |
| 6,643,387 | B1 | * | 11/2003 | Sethuraman et al. .......... 382/107 |
| 6,718,365 | B1 | * | 4/2004  | Dutta ............................ 709/203 |
| 7,538,814 | B2 | * | 5/2009  | Igarashi et al. ............... 348/349 |
| 8,364,698 | B2 | * | 1/2013  | Delgo et al. .................. 707/769 |
| 2001/0012062 | A1 | * | 8/2001  | Anderson ..................... 348/222 |
| 2003/0112357 | A1 | * | 6/2003  | Anderson ................. 348/333.05 |
| 2005/0179814 | A1 | * | 8/2005  | Pau et al. ...................... 348/448 |
| 2005/0231610 | A1 | * | 10/2005 | Anderson ................. 348/222.1 |
| 2005/0231611 | A1 | * | 10/2005 | Anderson et al. .......... 348/231.2 |
| 2006/0122997 | A1 | * | 6/2006  | Lin .................................. 707/5 |
| 2007/0076231 | A1 |   | 4/2007  | Enomoto |
| 2007/0078832 | A1 | * | 4/2007  | Ott et al. .......................... 707/3 |
| 2007/0097229 | A1 | * | 5/2007  | Matsubara et al. ........ 348/231.2 |

(Continued)

FOREIGN PATENT DOCUMENTS

JP   2007-101573   4/2007

OTHER PUBLICATIONS

European Search Report dated Feb. 3, 2011.

(Continued)

*Primary Examiner* — Sinh Tran
*Assistant Examiner* — Selam Gebriel
(74) *Attorney, Agent, or Firm* — McGinn IP Law Group, PLLC

(57) ABSTRACT

When a digital camera is set to a reproduction mode, it functions as an image display apparatus. When an instruction to display thumbnails of recorded images is given to the digital camera, a thumbnail display screen is displayed on a display panel. The thumbnail display screen includes a thumbnail display section for displaying thumbnails of the recorded images and an importance degree setting section having operating members provided for individual keywords, which are previously assigned to the recorded images. The user can set the importance of each keyword at an appropriate degree by manipulating the corresponding operating member. According to the importance degree of the keyword(s) assigned to each image, the corresponding thumbnail is displayed in a variable size in the thumbnail display section.

12 Claims, 13 Drawing Sheets

(56) References Cited

U.S. PATENT DOCUMENTS

2008/0086688 A1* 4/2008 Chandratillake et al. ..... 715/719
2008/0120290 A1   5/2008 Delgo et al.
2008/0120328 A1* 5/2008 Delgo et al. .................. 707/102

OTHER PUBLICATIONS

Japanese Office Action dated Jan. 11, 2013 with English translation thereof.

* cited by examiner

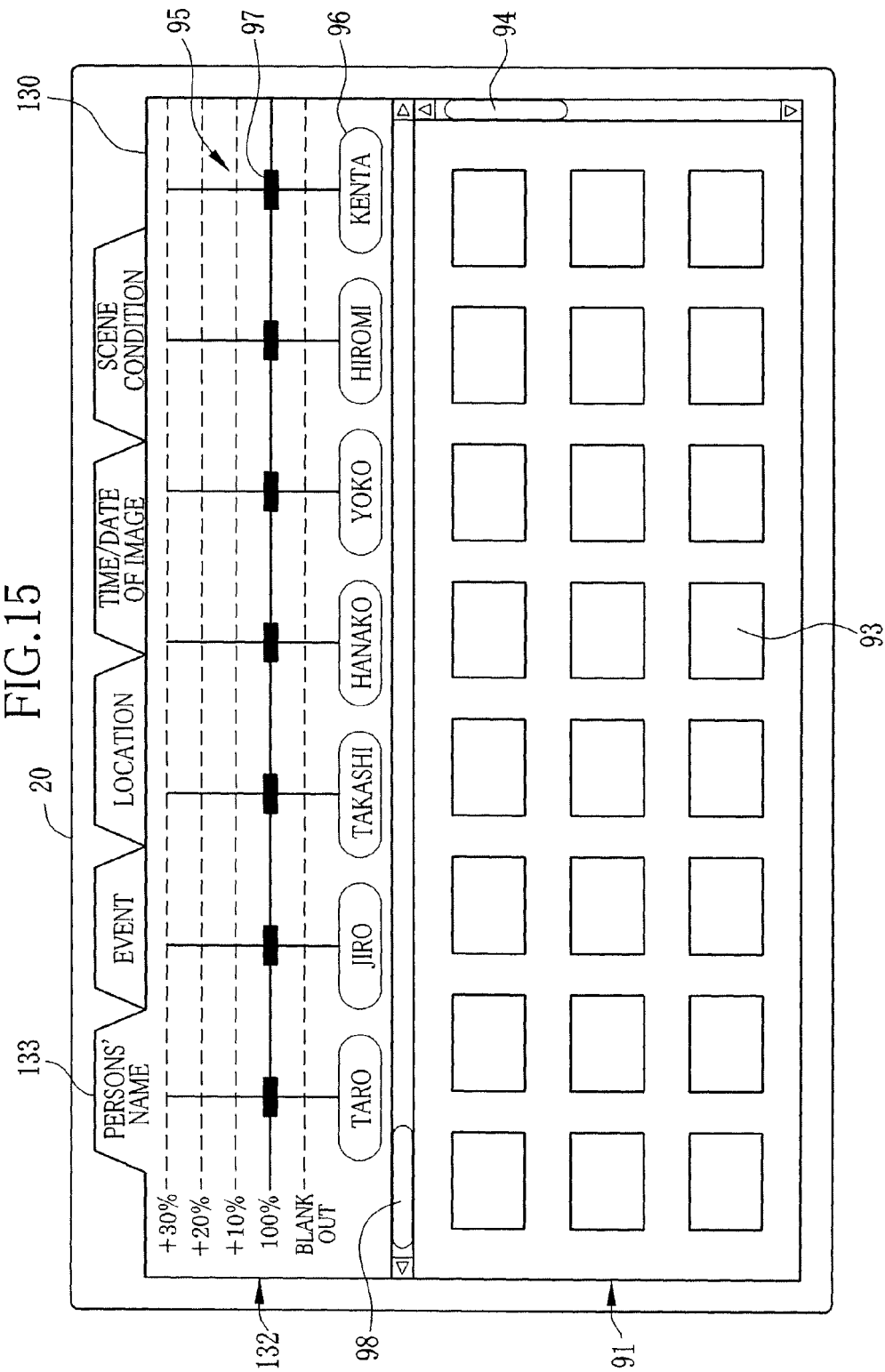

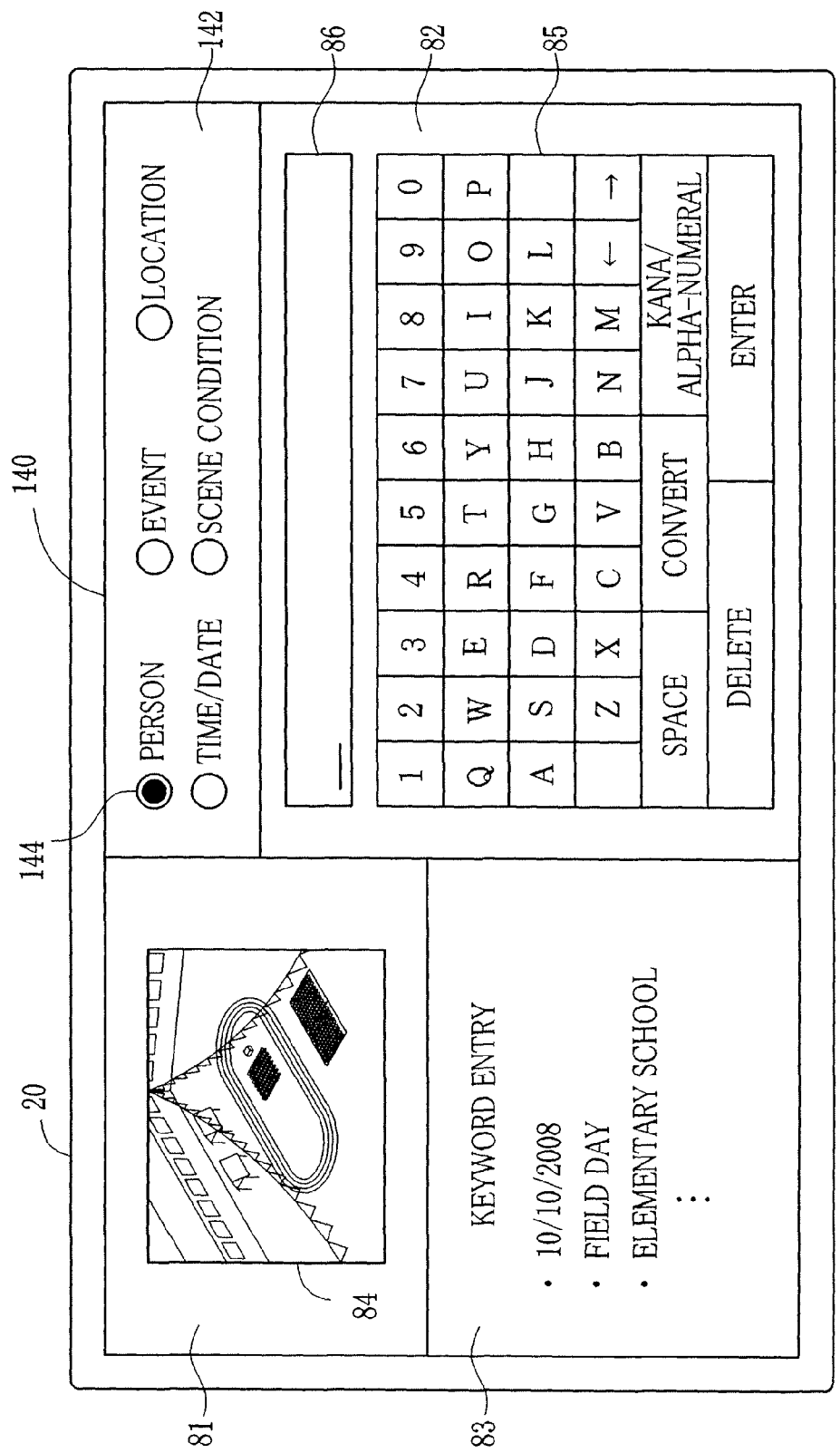

ically designed to display thumbnails of a plurality of images.

IMAGE DISPLAY APPARATUS AND IMAGE DISPLAY METHOD FOR DISPLAYING THUMBNAILS IN VARIABLE SIZES ACCORDING TO IMPORTANCE DEGREES OF KEYWORDS

FIELD OF THE INVENTION

The present invention relates to an image display apparatus and an image display method for displaying thumbnails of a plurality of images.

BACKGROUND OF THE INVENTION

Digital cameras and digital photo frames are known as an image display apparatus that reproduces digital image data on a display device such as a liquid crystal display panel. Such an image display apparatus may display a thumbnail display screen, which shows reduced pictures of images recorded as image data files in a storage medium (hereafter called "thumbnails"). The thumbnail display screen enables the user to choose any of the recorded images while browsing their thumbnails. By means of the thumbnails, the user can easily identify the target image even when there are many image data files in the storage medium.

Meanwhile, recent storage media have remarkably increased storage capacity, which makes it possible to store as many as from several hundred to several thousand image data files in one storage medium. With such enormous data volume, screening of image data is difficult even while the thumbnails of stored images are displayed. To cope with this inconvenience, US Patent No. 2007/0076231 (corresponding to JPA 2007-101573) suggests a method that can display thumbnails of limited image data files. In this method, before making image data selection, the user enters a search criterion such as the date of shooting, so that the thumbnails of merely those image data files which match the search criterion are shown up. The search criterion will narrow the search range of image data files to be displayed as thumbnails, so that the user can find the target image data file more easily even while a huge number of image data are stored in a storage medium.

The above-mentioned prior art also has a function of entering two or more search criteria so that those image data files which meet the search criteria will be shown as thumbnails. Where there are a huge number of image data files, a single search criterion can be insufficient to screen the image data files enough; many image data files may remain unscreened. Entering multiple search criteria to display thumbnails of merely those image data files which match the search criteria will achieve more detailed screening of the image data files.

However, using two or more search criteria to narrow the search range may result in excessive screening of the image data, hindering the thumbnails of expected image data files from being displayed. In that case, the user must repeat entering other search criteria in order to get a desired search result that satisfies the user's intention, which will bother the user and reduce efficiency of searching operation.

For this reason, where there are a huge number of image data files in a storage medium, the above prior art is not effective enough to facilitate identifying desired image data files. Therefore, there has been a demand for the image display apparatus to facilitate finding desired image data files.

The present invention is provided to solve the problem above; the object of the present invention is to make it easy to identify such image data files that meet the user's intention, even when a huge number of image data files are stored in a storage medium.

SUMMARY OF THE INVENTION

To achieve the above and other objects, the present invention provides an image display apparatus that comprises a display device for displaying images based on image data, the image data being stored for each image in association with at least a keyword relating to the each image; an importance degree setting controller for producing and displaying an importance degree setting section on the display device, to permit setting each keyword associated with the stored image data at an appropriate importance degree; and a thumbnail display controller for producing thumbnails of the stored images and displaying the thumbnails in an array on the display device, the thumbnail display controller controlling displaying the thumbnails in variable sizes according to the importance degrees of the respective keywords set through the importance degree setting section.

Preferably, a different image size is previously assigned to each of the importance degrees available for setting through the importance degree setting section. The importance degree setting controller preferably comprises an image size decider that decides the image size of the thumbnail of each image according to the importance degree set to at least a keyword of the each image, wherein the thumbnail display controller produces each thumbnail in the size decided by the image size decider.

In a preferred embodiment, the image size decider decides a magnification to a given standard size as the image size of each thumbnail. If two or more keywords are related to one image, the image size decider decides the magnification of the thumbnail of the one image based on a sum of variations in the respective image sizes from the standard size, which are assigned to the respective importance degrees of the two or more keywords.

The importance degrees set through the importance degree setting section may include a specific one for blanking out the thumbnail, wherein the image size decider may give priority to the specific degree over others such that the thumbnail of one image is not displayed if any of the keywords associated with the one image is set at the specific degree for blanking out, regardless of the importance degrees set to other keywords of the one image.

It is alternatively possible to display an icon smaller than the thumbnails in place of the thumbnail of one image if at least a keyword associated with the one image is set at the specific degree for blanking out the thumbnail.

The importance degrees set through the importance degree setting section may also include a specific one for fixing the thumbnail in a predetermined size, wherein the image size decider may give priority to the specific degree over others such that the thumbnail of one image is displayed in the predetermined size if any of the keywords associated with the one image is set at the specific importance degree, regardless of the importance degrees set to other keywords of the one image.

Preferably, the importance degree setting controller acquires every keyword associated with the stored images to provide operating members each for a different keyword in the importance degree setting section. The operating members are preferably arranged in the order from most frequent keyword among those associated with the stored images.

The importance degree setting controller may preferably sort the operating members into groups according to categories of corresponding keywords, and display the operating members group by group in the importance degree setting section.

It is preferable to display the importance degree setting section on the same screen as the thumbnails.

More preferably, the image display apparatus is provided with a keyword input device for inputting at least a keyword to be stored in association with each image.

In a preferred embodiment, the image data is stored for each image in an image data storage segment of a file, and the file includes a Meta data storage segment that stores keyword information containing at least a keyword relating to the image of that file. The importance degree setting controller reads out the keyword information from the files to produce the importance degree setting section.

The present invention also provides an image display method for producing thumbnails of images stored as image data and displaying the thumbnails in an array on a display device.

The method of the present invention comprises the steps of storing the image data of each image in a data file in association with keyword information containing at least a keyword relating to the each image; reading out the keyword information from the data files; producing and displaying an importance degree setting section on the display device based on the keyword information read from the data files; setting each of the keywords contained in the keyword information at an appropriate importance degree through the importance degree setting section; and controlling the display device to display the thumbnails of the stored images in variable sizes according to the importance degrees of the respective keywords set through the importance degree setting section.

According to the present invention, each image is stored in association with at least a keyword, and the importance degree setting section is displayed for the user to set the keyword each individually at an appropriate importance degree. According to the set importance degrees of the associated keywords, thumbnails of the stored images are displayed in variable sizes. Preferably, the size of the thumbnail is enlarged as the importance of the associated keyword is set at a higher degree. Therefore, the user may have the thumbnails of those images displayed in larger sizes, which are more likely to fit the user's intention or interest, by setting such keywords at higher importance degrees that relate to the user's intention or interest. Thus, the user can find desired image data more easily from among a huge number of image data files.

BRIEF DESCRIPTION OF THE DRAWINGS

The above and other objects and advantages of the present invention will be more apparent from the following detailed description of the preferred embodiments when read in conjunction with the accompanied drawings, wherein like reference numerals designate like or corresponding parts throughout the several views, and wherein:

FIG. 15 is an explanatory diagram illustrating a thumbnail display screen according to another embodiment, wherein the operating members are displayed in groups sorted according to categories of the keywords;

FIG. 16 is an explanatory diagram illustrating an example of a keyword input screen for the embodiment of FIG. 15.

DESCRIPTION OF THE PREFERRED EMBODIMENTS

Figure 1:
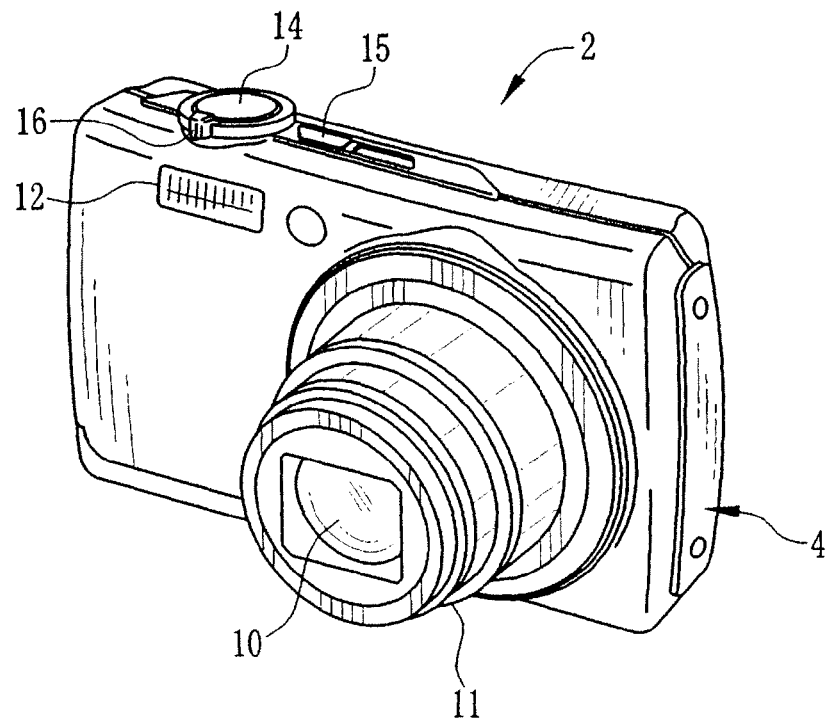
FIG. 1 is a front perspective view of a digital camera.

As shown in FIG. 1, a digital camera 2 (image display apparatus) 2 has a camera body 4 of a substantially rectangular prism shape. The camera body 4 has a front side provided with a lens barrel 11 holding a taking lens 10 therein, and a flash projector 12 for illuminating a target subject to shot. On a top side of the camera body 4 are provided a release button 14 for giving an instruction to take a shot, a power button 15 for turning a power source ON and OFF, and a zoom lever 16 for zooming the taking lens 10 toward a wide-angle side and a telephoto side.

The shutter button 14 is such a two-step switch that has a half-pressed position for causing the digital camera 2 to execute preparatory operations, such as auto-focusing (AF) and auto-exposure control (AE), to prepare for a shot. When the shutter button 14 is farther pressed to a full-pressed position, the instruction to capture an image is given to the digital camera 2. Then the digital camera 2 converts an image signal of a picture frame, as captured based on the preparatory operations, to an image data file.

Figure 2:
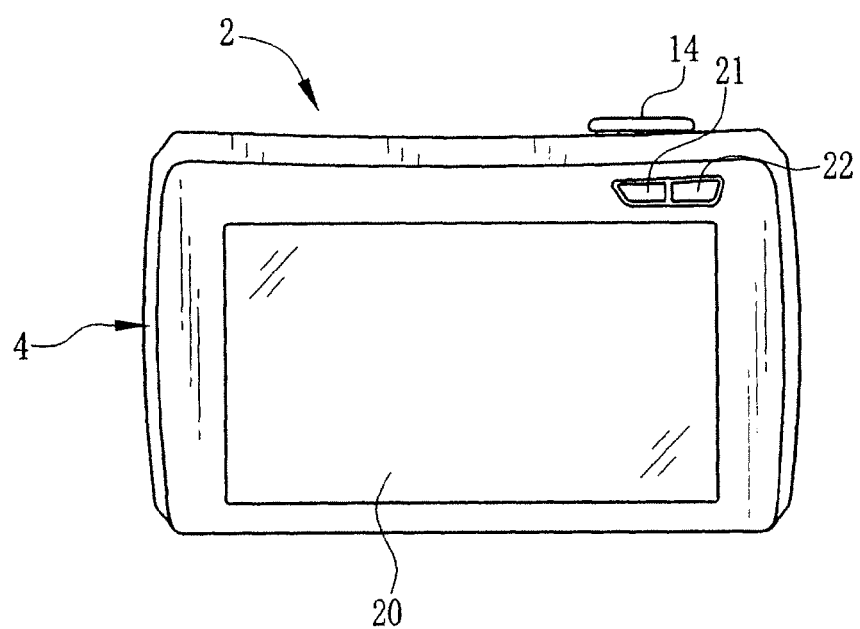
FIG. 2 is a rear view of the digital camera.

As shown in FIG. 2, the camera body 4 has an LCD display 20, a mode selection button 21 and a menu button 22 on its rear side. The digital camera 2 has many operation modes, including a still image capturing mode for capturing still images, a moving image capturing mode for capturing moving images, and a reproduction mode for reproducing captured images on the LCD display 20. The LCD display 20 displays captured images in the reproduction mode, a so-called through-image or viewfinder image during a standby stage in the image capturing modes, and a variety of menu screens in a setup mode. The mode selection button 21 is operated to switch the operation modes of the digital camera 2. For example, the operation modes are changed over one after another each time the mode selection button 21 is pressed down. The menu button 22 is operated to cause the LCD display 20 to display the setup menus.

In addition a touch panel 24 (see FIG. 3) is provided on the front of the LCD display 20. The touch panel 24 is mounted such that the obverse surface of the touch panel 24 aligns with the rear surface of the camera body 4. The touch panel 24 can locate a contact point of a finger or appropriate pen on the obverse surface of the touch panel 24.

Thus the digital camera 2 allows the user to make intuitive control of many operations, such as function-setting and display-switching, by putting the finger or pen on a target such as an icon or image displayed on the LCD display 20, or sliding the finger or pen after putting it on the target.

Figure 3:
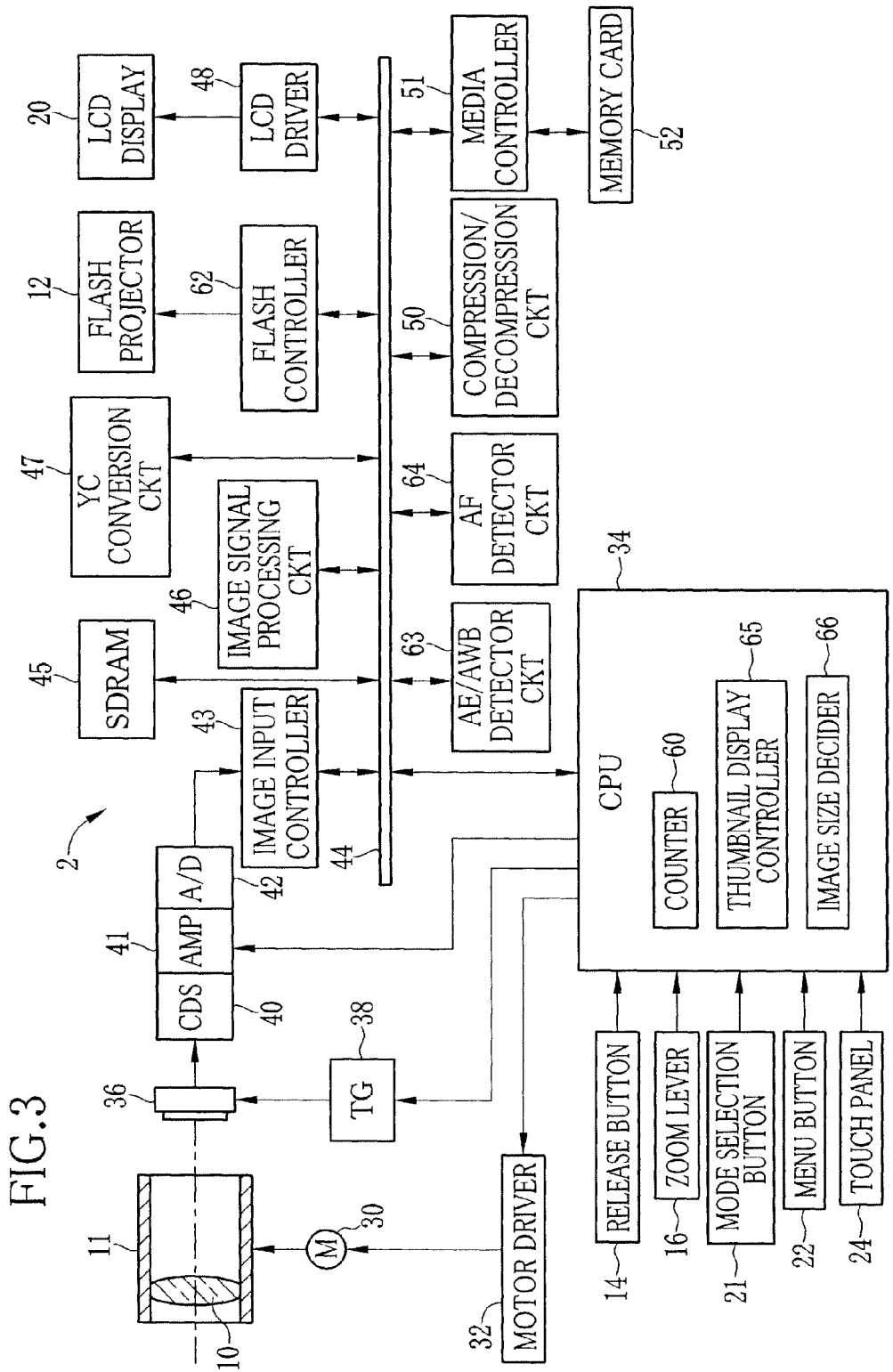
FIG. 3 is a schematic block diagram illustrating the circuitry of the digital camera.

As shown in FIG. 3, the lens barrel 11 is connected to a motor 30. The motor 30 supplies driving power to the lens barrel 11 through a transmission mechanism such as a gear mechanism, driving the lens barrel 11 move forward and rearward. Although FIG. 3 schematically shows the taking lens 10 as a single element, the taking lens 10 is a lens group composed of multiple lens elements, spacing between the lens elements being variable according to the lens barrel movement to change the lens magnification. Besides the optics for changing the magnification, the taking lens 10 also includes a stop mechanism for changing the stop aperture size to adjust the light amount traveling through the taking lens 10, and a focusing lens that can move along the optical axis for adjusting the focus of the taking lens 10.

The motor 30 is coupled to a motor driver 32. The motor driver 32 is connected to a CPU 34 that supervises the overall operation of the digital camera 2, so that the motor driver 32 feeds drive pulses to the motor 30 according to a control signal from the CPU 34. The motor 30 turns its rotary shaft in response to the drive pulses. As described in detail later, the CPU 34 functions as an importance degree setup control device of the present invention.

Behind the taking lens 10 is disposed a CCD 36 for converting an optical image of a subject formed through the taking lens 10 to electronic image data. The image data from the CCD 36 is fed to a correlated double sampling (CDS) circuit 40, to be converted to analog RGB image data that exactly corresponds to charges accumulated in respective cells of the CCD 36. The RGB image data from the CDS circuit 40 is amplified by an amplifier (AMP) 41 and then converted to digital image data through an A/D converter 42.

An image input controller 43 is connected to the CPU 34 via a bus 44, to control the CCD 36, the CDS 40, the AMP 41 and the A/D 42 according to control commands from the CPU 34. The image data from the A/D 42 is temporarily stored in a SDRAM 45.

An image signal processing circuit 46 reads out the image data from the SDRAM 45, to process it for gradation conversion, white balance correction, gamma correction, and other various kinds of image processing, and writes back the processed image data in the SDRAM 45. An YC conversion circuit 47 reads out the processed image data from the SDRAM 45, and converts it into a luminance signal Y and chrominance signals Cr and Cb. An LCD driver 48 reads out the image data from the SDRAM 45, after being processed and converted through the image signal processing circuit 46 and the YC conversion circuit 47, and converts the image data to an analog composite signal for displaying a corresponding image on the LCD display 20.

Figure 4:
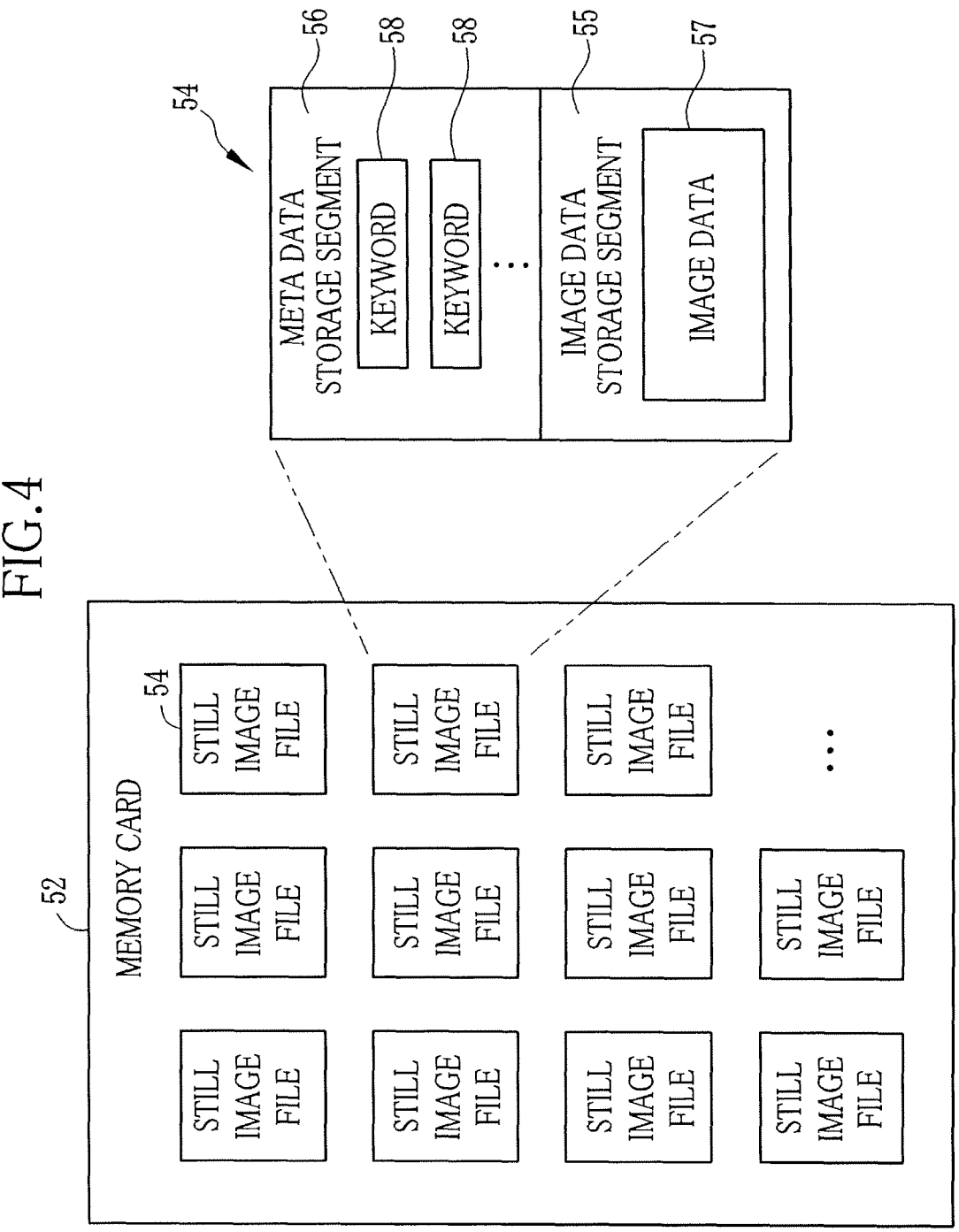
FIG. 4 is an explanatory diagram illustrating a structure of a still image file.

In a compression/decompression circuit 50, the image data as converted into the YC signals through the YC conversion circuit 47 is converted into a still image file 54 of a compressed file format such as TIFF or JPEG (see FIG. 4). A media controller 51 makes an access to a memory card 52 that is removably inserted into a not-shown media slot of the digital camera 2, to write the still image file 54 on the memory card 52 or read some still image files from the memory card 52.

As shown in FIG. 4, the memory card 52 can store a lot of still image files 54. The still image file 54 has an image data storage segment 55 and a Meta data storage segment 56. The image data storage segment 55 stores image data 57 representing a still image of a subject captured upon a shutter release operation. The Meta data storage segment 56 stores keyword information 58 depicting the contents of the still image represented by the image data 57. The keyword information 58 may include a plurality of keywords.

For example, the keywords stored as the keyword information 58 may include the time and date of shooting when the image was captured, the place where the image was captured, the name or tile of the subject that may be a person, an animal, a plant, a building, or an event such as a field day, a picnic under blossoms or a tour, and the scene condition such as daylight, night view or underwater. Among these keywords, the date and time of shooting is automatically input in the keyword information 58 during the production process of the still image file 54.

The CPU 34 includes a counter 60 functioning as a clock in the digital camera 2. When the release button 14 is pressed to give an instruction to capture an image, the CPU 34 controls the respective components of the digital camera 2 to produce the still image file 54, and at the same time, refers to the counter 60 to determine the time and date at which the release button 14 was pressed. Thus the CPU 34 writes the time and date of capturing the image, e.g. 15:13'26"_0702_2009, as the keyword information 58 in the Meta data storage segment 56 of the corresponding still image file 54. Other keywords than the time and date of shooting may be optionally written as the keyword information 58 by the user after the shooting operation.

The buss 44 interconnects a flash controller 62, an AE/AWB detector circuit 63 and an AF detector circuit 64 besides the above-mentioned components. The flash controller 62 controls the flash projector 12 to emit a flash of light according to a flash signal from the CPU 34. The AE/AWB detector circuit 63 calculates a light value representative of the brightness of the subject on the basis of a product of the luminance signal Y and the chrominance signals Cr and Cb, and transfers the light value to the CPU 34. Based on the light value, the CPU 34 checks whether the exposure value and white balance of the image are proper or not, to control the stop mechanism of the taking lens 10 and the CCD 36 accordingly.

The AF detector circuit 64 calculates an in-focus position of the taking lens 10 on the basis of the digital image data from the A/D 42, and outputs the calculated in-focus position to the CPU 34. The CPU 34 controls the AF detector circuit 64 to calculate the in-focus position during the preparatory operations responsive to the half-pressing of the release button 14. According to the calculated in-focus position, the CPU 34 controls the position of the focus lens to bring the taking lens 10 to the in-focus position.

The CPU 34 is also connected to many kinds of operating members, including the release button 14, the zoom lever 16, the mode selection button 21, the menu button 22 and the touch panel 24. These operating members individually detect operations done by the user, to output a signal corresponding to the detected operation to the CPU 34.

Figure 5:
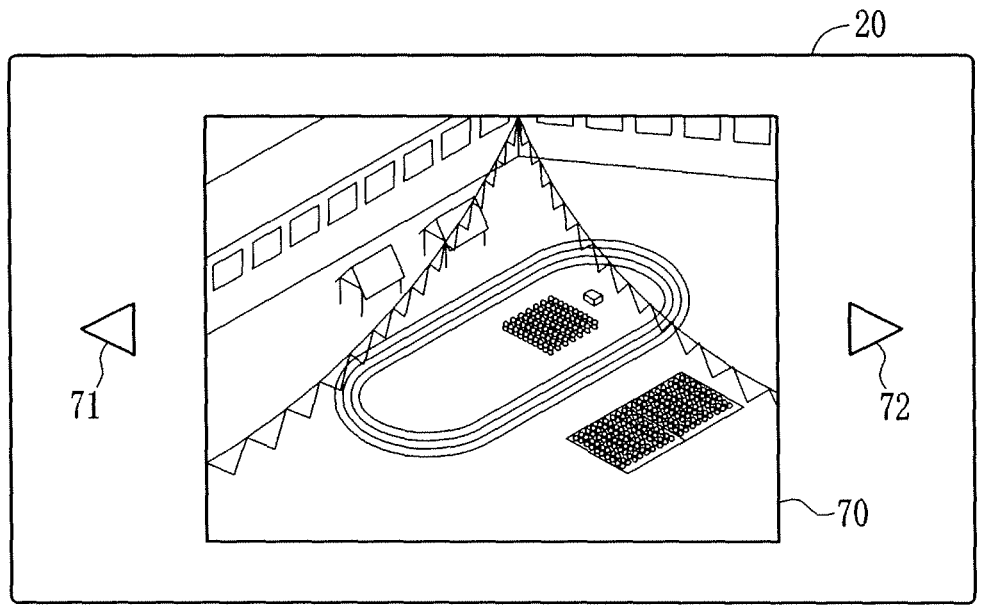
FIG. 5 is an explanatory diagram illustrating an example of a display screen in a reproduction mode.

When the digital camera 2 is set in the reproduction mode by operating the mode selection button 21, the CPU 34 reads out the still image file 54 from the memory card 52 in the sequence from the oldest with respect to the time and date of shooting that is indicated by the keyword information 58. Thus, as shown in FIG. 5, the CPU 34 causes the LCD display 20 to display a still image 70 corresponding to the image data 57 of the read still image file 54. At the same time, the CPU 34 causes the LCD display 20 to display feed buttons 71 and 72 for feeding the displayed image 70 one after another in the backward and forward directions.

When the touch panel 24 detects a touch on the feed button 72, the CPU 34 reads out the next still image file 54 to the still image file 54 of the displayed image 70 from the memory card 52 in the sequence from the oldest, causing the LCD display 20 to display the next still image based on the read still image file 54. On the contrary when the touch panel 24 detects a touch on the feed button 71, the CPU 34 reads out the preceding still image file 54 to the still image file 54 of the displayed image 70 from the memory card 52 in the sequence from the oldest, causing the LCD display 20 to display the preceding still image based on the read still image file 54.

Thus, while touching the feed button 71 or 72 in the reproduction mode, the user can sequentially brows the respective still images 70 of the still image files 54 written on the memory card 52, in the order of time and date of capturing these images.

When the touch panel 24 detects a press on the menu button 22 in the reproduction mode, the CPU 34 controls the LCD display 20 to display a dialog box 74 with a keyword input button 75 and a thumbnail display button 76. The keyword input button 75 is for inputting a keyword as the keyword information 58 to be written in the still image file 54 of the presently displayed still image 70. The thumbnail display button 76 is for instructing to display respective thumbnails of the still image files 54 recorded on the memory card 52.

Figure 7:
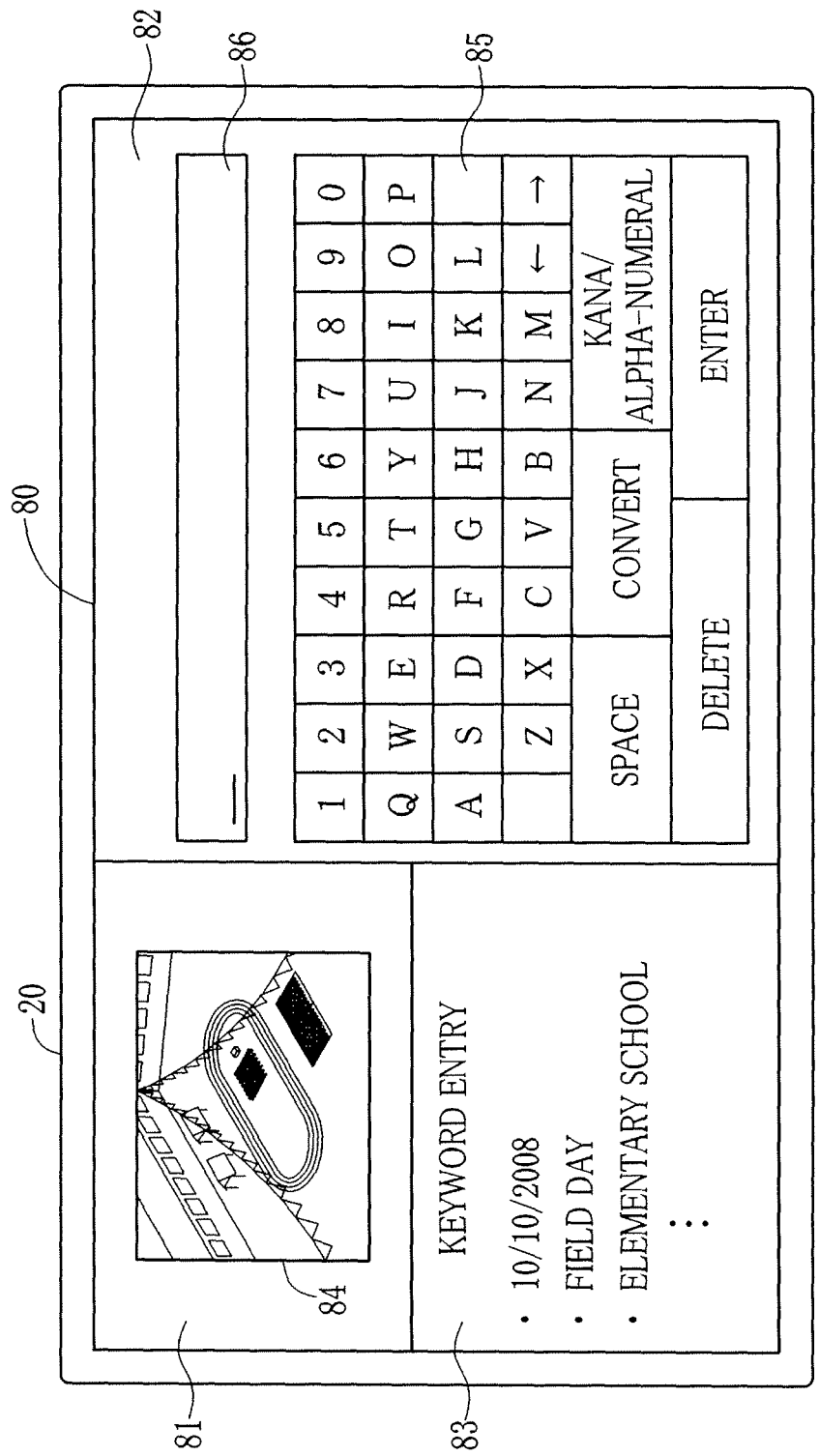
FIG. 7 is an explanatory diagram illustrating an example of a keyword input screen.

When the touch panel 24 detects a touch on the keyword input button 75, the CPU 34 controls the LCD display 20 to display a keyword input screen (keyword input device) 80 as shown in FIG. 7. The keyword input screen 80 includes an image display section 81, a keyword input section 82 and a keyword entry display section 83. The image display section 81 displays a size-reduced image 84 of the still image 70 of the still image file 54 to input the keyword information 58. The keyword input section 82 displays a keyboard 85 having an array of keys of various kinds for inputting alphanumeric characters and other characters, and instructing conversion and other commands. The keyword input section 82 also displays an input box for displaying a character string input through the keyboard 85. The keyword entry display section 83 displays those keywords which have already been contained in the keyword information 58 of the present still image file 54.

When an instruction to input a keyword to the still image file 54 of the displayed still image 70 is given by touching the keyword input button 75, the CPU 34 produces the size-reduced image 84 of the displayed still image 70 on the basis of the image data 57 of the corresponding still image file 54, and at the same time, refers to the Meta data storage segment 56 of that still image file 54 to read out the keyword information 58 from the Meta data storage segment 56. Then the CPU 34 controls the LCD display 20 to display the produced size-reduced image 83 and the read keyword information 58 respectively in the image display section 81 and the keyword entry display section 83 on the keyword input screen 80.

On the keyword input screen 80, the user inputs an appropriate keyword as a character string in an entry box 86 through the keyboard 85 and then touches an Enter key of the keyboard 85. Thereby the character string in the entry box 86 is written as the keyword information 58 in the Meta data storage segment 56 of the corresponding still image file 54. Moreover, when the Enter key is touched, the character string in the entry box 86 is erased and displayed as a keyword added to the keyword information 58 in the keyword entry display section 83.

The procedure of inputting the keyword information 58 on the keyword input screen 80 may be terminated either by instructing to end the keyword input operation through a dialog box that is displayed by pressing the menu button 22, or by pressing the mode selection button 21 to switch the digital camera 2 to another operation mode. When the menu button 22 is pressed to give an instruction to end the keyword input operation, the LCD display 20 is switched from the keyword input screen 80 to the reproduction mode screen as shown in FIG. 5. When the mode selection button 21 is pressed to change the operation mode of the digital camera 2 to the still image capturing mode or the moving image capturing mode, the LCD display 20 is switched from the keyword input screen 80 to a through-image display screen.

Figure 8:
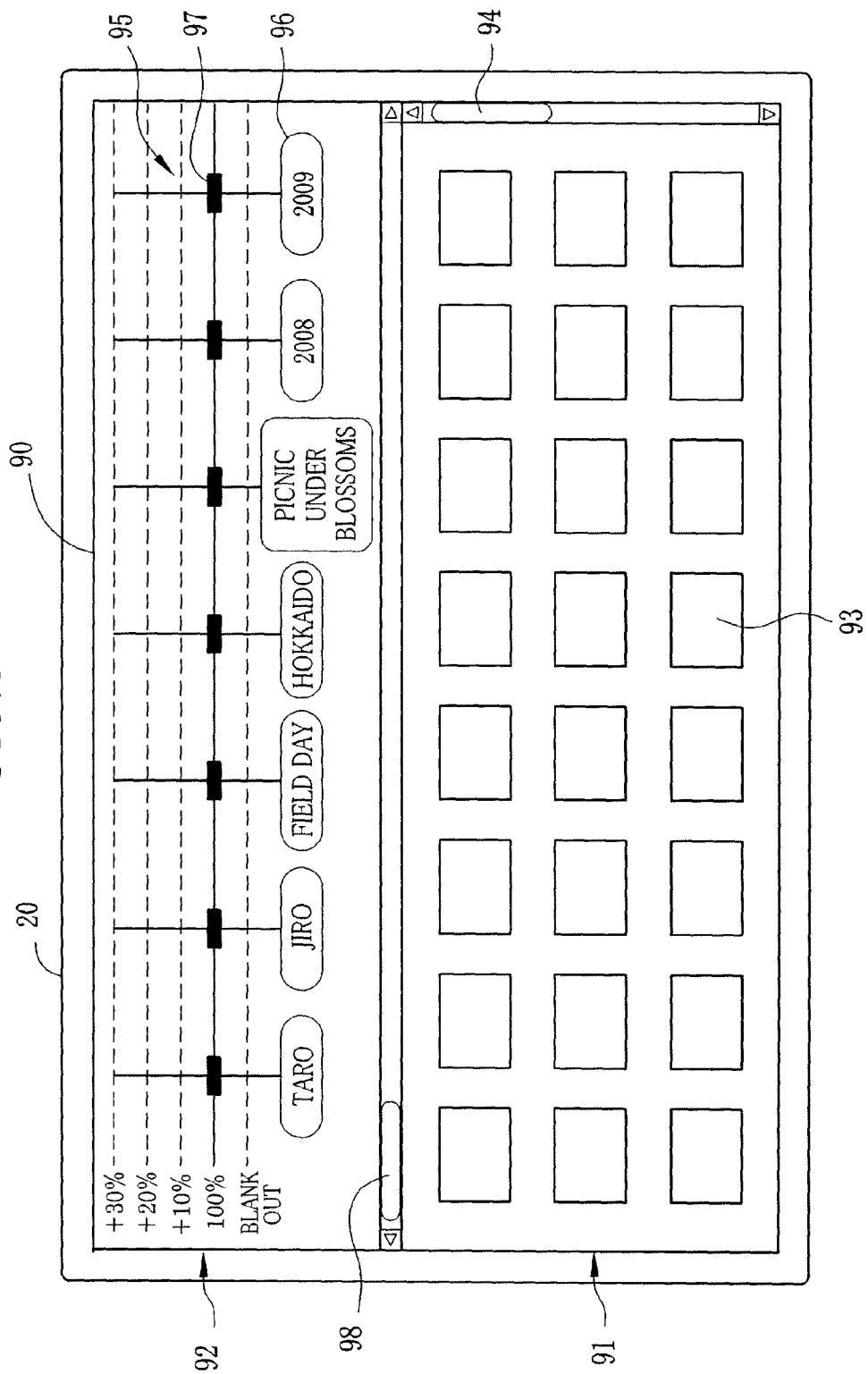
FIG. 8 is an explanatory diagram illustrating a thumbnail display screen.

On the other hand, when the touch panel 24 detects a touch on the thumbnail display button 76 in the dialog box 74 (see FIG. 6), the CPU 34 causes the LCD display 20 to display a thumbnail display screen 90 as shown in FIG. 8. The thumbnail display screen 90 includes a thumbnail display section 91 displaying an array of thumbnails 93 representative of the respective still image files 54 recorded on the memory card 52, and an importance degree setting section 92 for setting the importance of each keyword individually among those included in the keyword information 58 of the still image files 54 in the memory card 52.

On the thumbnail display screen 90, the user can select one or more of the still image files 54 by touching the corresponding thumbnail or thumbnails 93. When a thumbnail 93 is touched, the LCD display 20 is switched from the thumbnail display screen 90 to the reproduction mode screen as shown in FIG. 5, displaying a still image 70 corresponding to the touched thumbnail 93.

A scroll bar 94 is provided on the right margin of the thumbnail display section 91. By touching and sliding the scroll bar 94 up and down, the thumbnail display section 91 scrolls up and down. Thus the thumbnail display section 91 can display every thumbnail 93 of all the still image files 54 stored in the memory card 52 even while the thumbnail display section 91 cannot display all the thumbnails 93 at once.

The importance degree setting section 92 includes a plurality of operating members 95 corresponding to the respective keywords contained in the keyword information 58 of all the still image files 54 recorded on the memory card 52. The operating member 95 is a graphic user interface (GUI) formed for example as a slide bar consisting of a tag 96 for displaying a character string representative of a keyword, and a slider 97 for setting the importance of the keyword displayed on the tag 96.

A scroll bar 98 is provided on a bottom margin of the importance degree setting section 92, enabling lateral scroll of the importance degree setting section 92. By touching and sliding the scroll bar 98 to the right or left, the importance degree setting section 92 scrolls laterally, enabling displaying every operating member 95 even while all the operating members 95 cannot be displayed at once.

The importance degree setting section 92 also includes five scale lines for setting the importance of the respective keywords in cooperation with the sliders 97 of the operating members 95. By touching and sliding the slider 97 of one operating member 95 to put it on a selected one of the scale lines, the importance of the keyword as displayed on the tag 96 of the one operating member 95 is set to the corresponding degree to the selected scale line. The scale lines represent five degrees of importance: blank-out, 100% display, +10% display, +20% display, and +30% display in the order of increasing importance.

When the slider 97 is put on the scale line for the 100% display, the importance of the corresponding keyword is set at the degree of 100% display, whereby the thumbnails 93 of those still image files 54 containing the corresponding keyword as the keyword information 58 are designated to be displayed in a predetermined standard size on the LCD display 20.

When the slider 97 is put on the scale line for the +10% display, the importance of the corresponding keyword is set at the degree of +10% display, whereby the size of thumbnails 93 of those still image files 54 containing the corresponding keyword as the keyword information 58 is designated to increase 10% from the standard size. In the same way, when the slider 97 is put on the scale line for the +20% display or +30% display, the importance of the corresponding keyword is set at the degree of +20% display or +30% display, designating the corresponding thumbnails 93 to be displayed in a larger size that is 120% or 130% of the standard size, respectively.

Putting the slider 97 on the scale line for blank-out sets the importance of the corresponding keyword at the lowest degree, whereby the CPU 34 is instructed to blank out the thumbnails 93 of those still image files 54 containing the corresponding keyword.

As described above, the importance degree setting section 92 allows the user to set the importance degree of each keyword contained in the keyword information 58 in association with the image size of the corresponding thumbnails 93. As a result, the thumbnail 93 will be displayed in the larger size, as the higher degree of importance is set to the keyword contained in the keyword information 58 of the corresponding still image file 54.

When the thumbnail display button 76 is touched to display the thumbnails 93 of the still image files 54 recorded on the memory card 52, the CPU 34 accesses the memory card 52 to read out all keyword information 58 from the Meta data storage segment 56 of every still image file 54 recorded on the memory card 52. From the read keyword information 58, the CPU 34 then produces the operating members 95 to be displayed on the importance degree setting section 92, wherein the CPU 34 treats the same keyword contained in different still image files 54 as a single keyword.

For example, in a case where one still image file stores a keyword "Taro" and a keyword "Field day" as the keyword information 58, whereas another still image file stores a keyword "Jiro" and a keyword "Field day" as the keyword information 58, the CPU 34 treats the keyword "Field day" as a single keyword, and produces three operating members 95 for the keywords "Taro", "Jiro" and "Field day".

Thus, the CPU 34 produces the operating members 95 for setting the importance of individual ones of different keywords contained in the keyword information 58 of all still image files 54 stored in the memory card 52.

After producing the operating members 95, the CPU 34 displays the produced operating members 95 in the importance degree setting section 92, arranged in the order of most frequent keyword to least frequent among those keywords contained in the keyword information 58 of the still image files 54 within the memory card 52. For example, in a case where the keyword "Taro" is stored in six of the files 54, "Jiro" is stored in five of the files 54, and "Field day" is stored in four of the files 54, the operating members 95 are arranged in the order from the left, "Taro", "Jiro" and "Field day".

It may be presumed that the frequency of a particular keyword written in the still image files 54, i.e. the number of still image files 54 that is associated with the particular keyword, tends to represent user's preference for the keyword. Therefore, arranging the operating members 95 in the order of most frequent keyword first in the importance degree setting section 92 can improve operability of the importance degree setting section 92 in setting the importance degrees of the keywords.

The CPU 34 includes a thumbnail display controller 65 and an image size decider 66. When the thumbnail display button 76 is touched to give an instruction to display the thumbnails 93, the thumbnail display controller 65 reads the still image files 54 stored in the memory card 52 to produce the thumbnails 93 of the still image files 54 from the image data 57 contained in the respective still image files 54. The thumbnail display controller 65 first produces the respective thumbnails 93 in the standard size or 100% size. Then the thumbnail display controller arranges the thumbnails 93 in the order in which the corresponding images are captured, based on the time and date of shooting recorded in the Meta data storage segment 56 of each still image file 54.

Thus, on the thumbnail display screen 90 appearing in response to a touch on the thumbnail display button 76, the thumbnails 93 are initially displayed in the standard size in the thumbnail display section 91, and the sliders 97 of the operating members 95 are initially placed on the scale line for 100% display in the importance degree setting section 92.

After the thumbnail display screen 90 is displayed on the LCD display 20, the image size decider 66 starts an image size deciding process in response to an operation on any slider 97, i.e. when the importance degree of any keyword is changed by sliding the slider 97 off the scale line for 100% display.

In the image size deciding process, the image size decider 66 reads one still image file 54 from the memory card 52, to retrieve all keywords contained in the keyword information 58 from the Meta data storage segment of the one still image file 54. Then the image size decider 66 checks the position of the slider 97 on each of the operating members 95 relating to the retrieved keywords, to recognize the importance degree of each of these keywords. After recognizing the importance degree of each keyword, the image size decider 66 decides the image size of the thumbnail 93 of the one still image file 54 according to the importance of the keyword or keywords written in the one still image file 54.

In a case where only one keyword is written in the still image file 54, the image size decider 66 decides the image size of the thumbnail 93 of the still image file 54 according to the importance degree of the one keyword. On the other hand, in a case where the still image file 54 stores two or more keywords, the image size decider 66 sums up the percentages of enlargements from 100% of the image size, which are assigned as the importance degrees to the respective keywords, to display the thumbnail 93 of the corresponding still image file 54 in a size enlarged by the total percentage from the standard size.

For example, in one still image file storing three keywords "Taro", "Jiro" and "Field day" as the keyword information 58, the importance of the keywords "Taro" and "Jiro" may be set at the degree of +30% display, whereas the importance of the keyword "Field day" may be maintained at the degree of 100% display. In that case, the total percentage of enlargement from the 100% size is (30%+30%+0%)=60%, so that the image size decider 66 decides to enlarge the thumbnail of that still image file by 60% from the standard or 100% size. That is, the corresponding thumbnail is decided to be displayed in 160% size compared to the standard size. However, an excessively large thumbnail can harm the total visibility of the thumbnail display section 91. Therefore, the image size decider 66 preferably puts a limit on the image size of the thumbnails. For example, the image size of the thumbnails is defined in a range up to 200% of the standard size. The maximum thumbnail size is not limited to this value but may be defined appropriately according to many factors such as the screen size of the LCD display 20.

It is to be noted that if any of the keywords contained in the keyword information 58 of one still image file 54 is set at the importance degree of blank-out, the image size decider 66 puts priority to the blank-out degree over other importance degrees. Therefore, the image size decider 66 decides not to display the thumbnails of those still image files 54 with such a keyword that is set at the blank-out degree.

In an example of a still image file storing three keywords "Taro", "Jiro" and "Field day" as the keyword information 58, even if the importance of the keywords "Taro" and "Jiro" is set at the degree of +30% display, if the importance of the keyword "Field day" is set at the blank-out degree, the image size decider 66 decides to blank out the thumbnail of this still image file.

The image size decider 66 executes the above-described image size deciding process on every still image file 54 stored in the memory card 52, to decide the image size of the thumbnail 93 of each individual still image file 54 according to the importance degrees of the respective keywords. After deciding the thumbnail image size of one image file, the image size decider 66 sends data of the decided image size to the thumbnail display controller 65.

Figure 9:
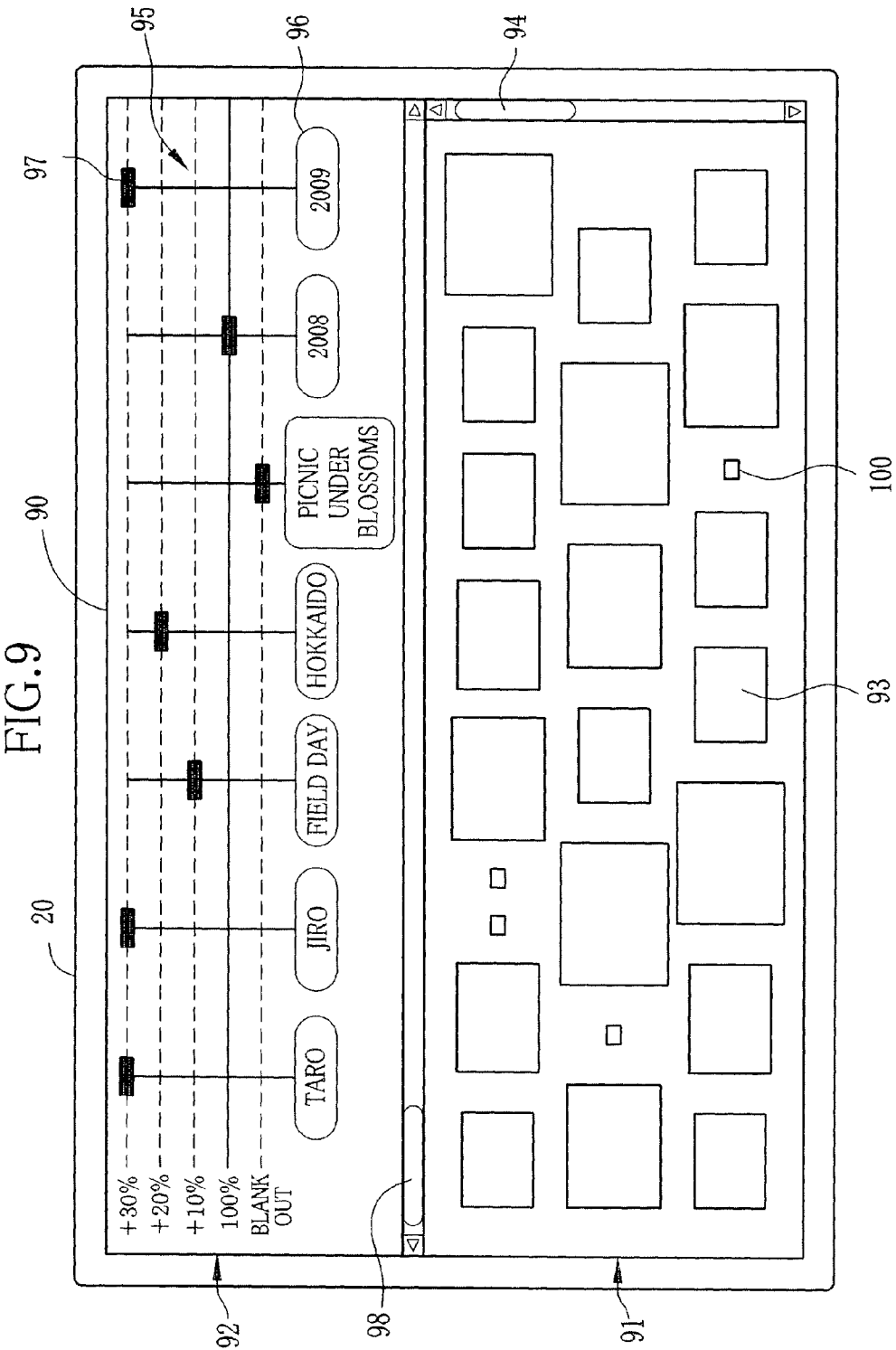
FIG. 9 is an explanatory diagram illustrating an example of the thumbnail display screen, wherein thumbnails are displayed in variable image sizes according to the degree of importance.

Upon receipt of the image size data from the image size decider 66, the thumbnail display controller 65 reproduces the thumbnail 93 of the corresponding still image file 54 in various image sizes represented by the image size data, displaying the various sizes of thumbnails 93 in the thumbnail display section 91, as shown in FIG. 9. The thumbnail display controller 65 revises the thumbnail display screen 90 by repeating the above-described process upon each receipt of the image size data from the image size decider 66. Thus the image size of each thumbnail 93 in the thumbnail display section 91 changes depending on the importance degree of the associated keyword information 58, which the user sets in the importance degree setting section 92.

As for the still image files 54, of which the image size decider 66 decides not to display the thumbnails 93, the thumbnail display controller 65 controls the LCD display 20 to display micro icons 100 instead in the same arrangement as their thumbnails 93 in the thumbnail display section 91. When the user touches the icon 100, the LCD display 20 is switched from the thumbnail display screen 90 to the reproduction mode screen as shown in FIG. 5, showing the still image 70 of the still image file 54 corresponding to the touched icon 100, in the same way as for the thumbnails 93.

Displaying the icons 100 in place of the thumbnails 93 informs the user of the presence of blanked-out still image files 54, so that the user can make a final decision as to whether the blanked-out sill image file 54 shown by the icon 100 is a desired one or not, with reference to the neighboring thumbnails 93, which will further improve the operability of the thumbnail display screen 90. Note that the icon 100 may have any size smaller than the 100% standard size of the thumbnails 93, insofar as it permits the touching operation. Although the icons 100 are shown as rectangular ones in FIG. 9, the icons 100 may have any shape insofar as it meets the above conditions. The icon 100 may also be such a thumbnail 93 that is so reduced as its image content to be unrecognizable.

Figure 10:
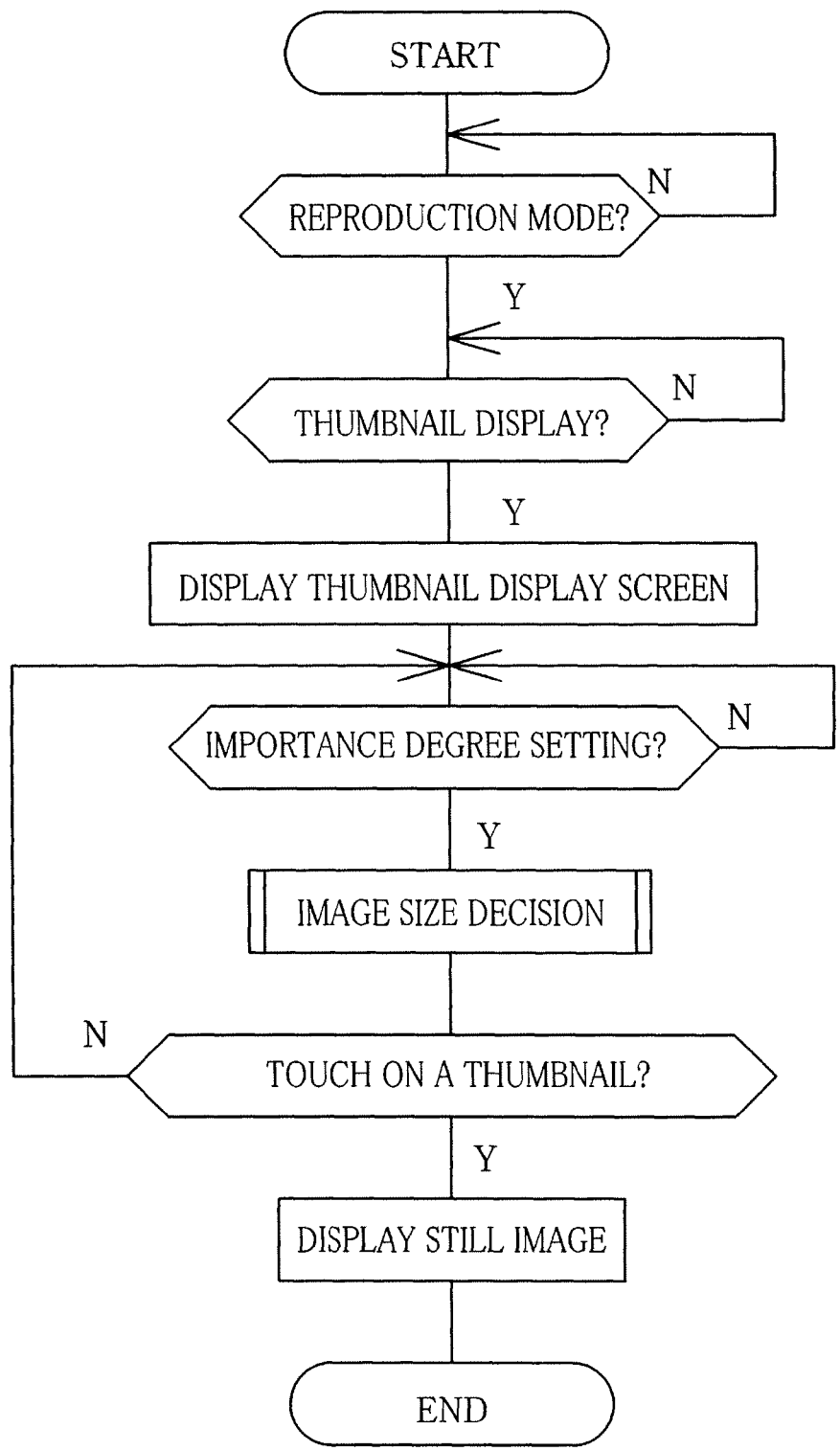
FIG. 10 is a flowchart schematically illustrating an operation of the digital camera.

Now, the operation of the digital camera 2 configured as above will be described with reference to the flowchart of FIG. 10. When the mode selection button 21 is operated to set the digital camera 2 to the reproduction mode, the still image 70 of the oldest still image file 54 regarding the time and date of shooting is displayed on the LCD display 20 (see FIG. 5). In the reproduction mode, the user can browse the still images 70 one after another in the time sequence in which the still image files 54 are recorded on the memory card 52 by touching the feed button 71 or 72.

Figure 6:
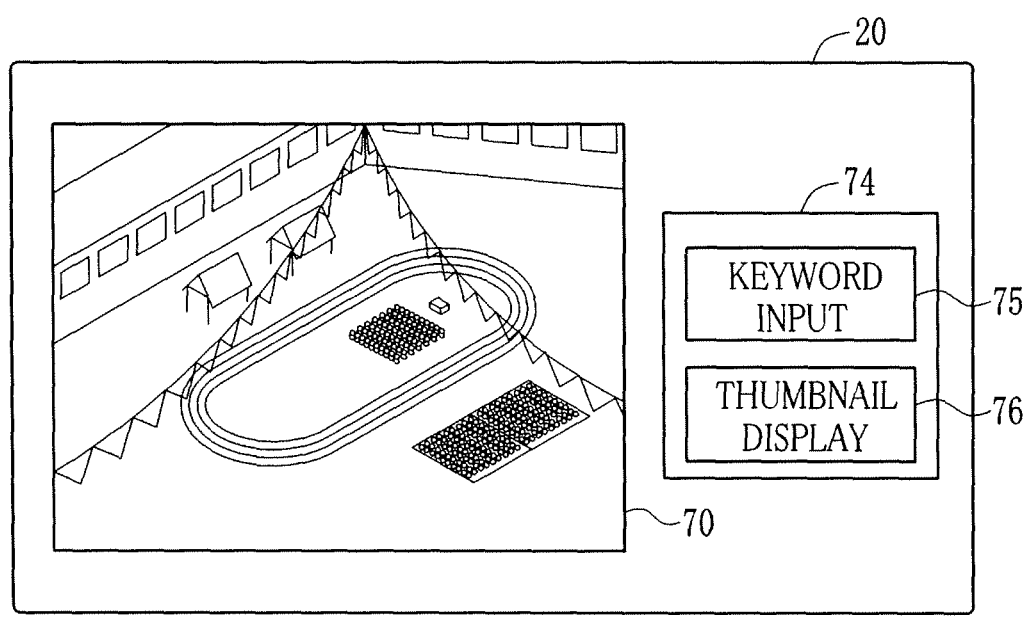
FIG. 6 is an explanatory diagram illustrating the screen displaying a dialog box.

In a case where the memory card 52 stores an enormous number of still image files 54, it is obviously cumbersome and often time-consuming for the user to operate the feed button 71 or 72 to display the still images 70 one by one till the user finds out an intended one among the stored still image files 54. In that case, the user can press the menu button 22 in the reproduction mode to display the dialog box 74 on the LCD display 20, as shown in FIG. 6. In the dialog box 74, the user touches the thumbnail display button 76 to give an instruction to display thumbnails of all still image files 54 stored in the memory card 52.

In response to the instruction to display thumbnails, the thumbnail display screen 90 is displayed on the LCD display 20, as shown in FIG. 8, wherein the thumbnails 93 of the still image files 54 are displayed in the 100% size in the thumbnail display section 91, and the operating members 95 with the sliders 97 on the scale line for 100% display are displayed in the importance degree setting section 92.

The user touches and slides the sliders 97 of some of the operating members 95 to change the importance degrees of the respective keywords assigned to these operating members 95. Concretely, the user puts up the importance degrees of those keywords which meet the user's intention, and puts down the importance degrees of those keywords which relate less to the user's intention.

Figure 11:
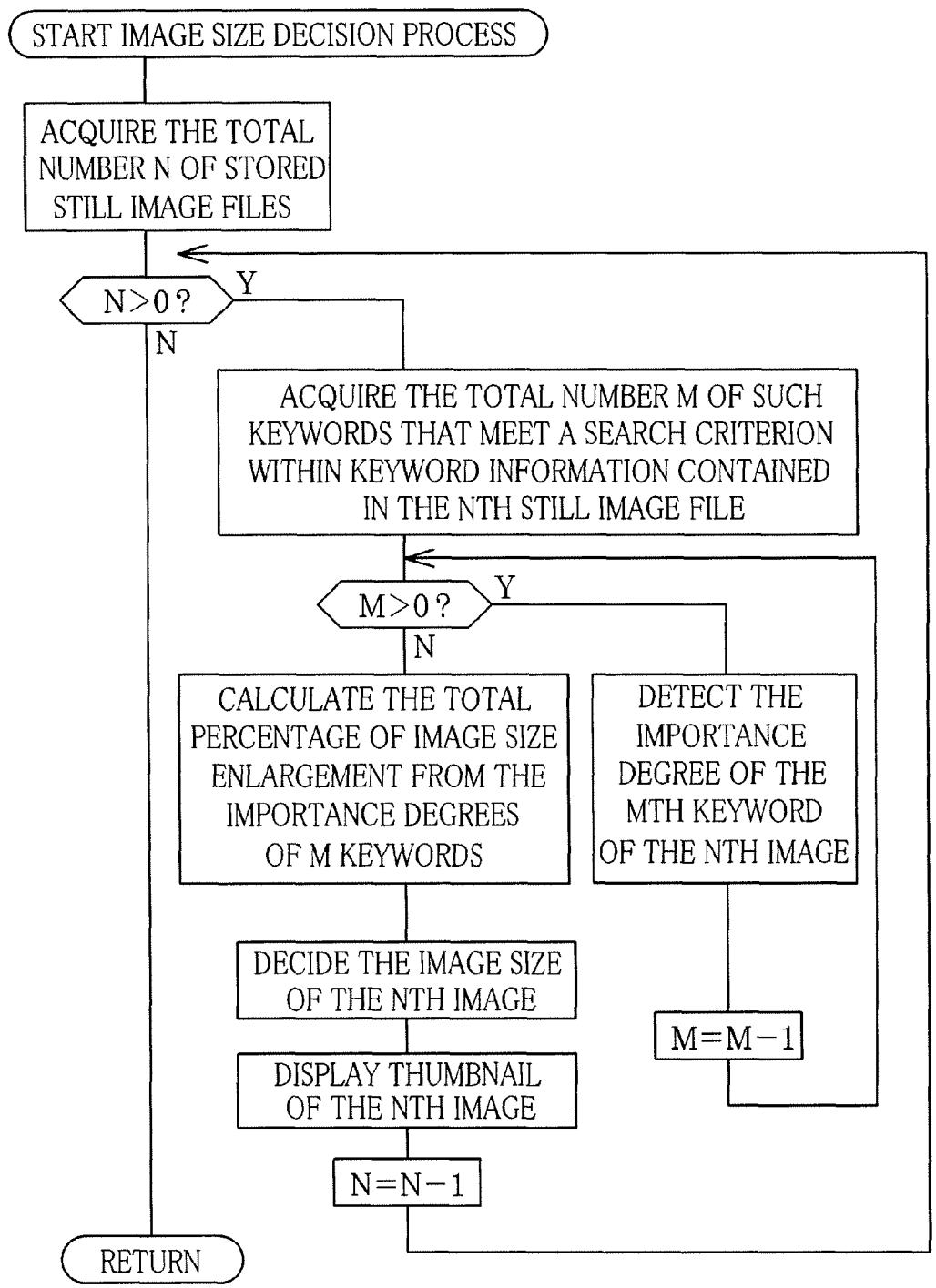
FIG. 11 is a flowchart schematically illustrating the procedure of an image size deciding process.

Corresponding to the importance degrees set by the operating members 95, the image size decider 66 executes the process for deciding the image size of each individual thumbnail 93. In the image size deciding process, as shown in the flowchart of FIG. 11, the image size decider 66 first acquires the total number N of still image files 54 stored in the memory card 52. Then the image size decider 66 reads out the $N^{th}$ still image file from the memory card 52. Thereafter, the image size decider 66 refers to the Meta data storage segment 56 of the read still image file 54, to acquire the number M of such keywords that meet a search criterion that the importance thereof is set at other than the degree of 100% display, among those contained as the keyword information 58 in the Meta data storage segment 56.

After acquiring the number M, the image size decider 66 determines the importance degree of the $M^{th}$ keyword among those keywords that meet the search criterion within the keyword information 58 of the read still image file 54. Thereafter, the image size decider 66 subtracts 1 from the number M. The image size decider 66 repeats this process until the number M gets down to zero, thereby determining the importance degrees of the respective keywords which meet the above search criterion.

Thereafter, based on the determined importance degrees, the image size decider 66 calculates the total percentage of enlargement of the thumbnail 93 of the read still image file 54 from the 100% standard size. If the number M is zero when it is first detected from the read still image file 54, it means that there is no such keyword that meets the search criterion within the keyword information 58 of the read still image file 54, the total percentage of enlargement is also zero, so the thumbnail size is decided to be the 100% size. Note that if any of the keywords assigned to the $N^{th}$ still image file 54 is set at the blank-out degree, the image size decider 66 decides to display the icon 100 instead of the thumbnail 93 for the $N^{th}$ still image file 54.

The image size decider 66 outputs data of the decided image size to the thumbnail display controller 65. Then the thumbnail display controller 65 generates a thumbnail 93 of the $N^{th}$ still image file 54 in the image size designated by the image size data from the image size decider 66, displaying the thumbnail 93 in the designated size in the thumbnail display section 91.

After outputting the image size data to the thumbnail display controller 65, the image size decider 66 subtracts 1 from the number N. The thumbnail display controller 65 repeats the same process as above until the number N gets down to zero, that is, with respect to all the still image files 54 stored in the memory card 52. Thus, the thumbnails 93 displayed in the thumbnail display section 91 change in size depending on the importance degrees of the respective keywords as set in the importance degree setting section 92, and the thumbnail display screen 90 is revised correspondingly.

As the user sets the higher importance degree to those keywords which meet the user's intention, the revised thumbnail display screen 90 displays the thumbnails 93 in the larger size the more the corresponding still image files 54 reflect the user's intention. Accordingly, with reference to the enlarged thumbnails 93, the user can find the intended still image files 54 more easily among the enormous number of stored still image files 54 in the memory card 52.

When the user finds the thumbnail 93 of the intended still image file 54, the user touches on that thumbnail 93. Then the LCD display 20 switches from the thumbnail display screen 90 to the reproduction mode screen as shown in FIG. 5, displaying the still image 70 of the still image file 54 corresponding to the touched thumbnail 93.

In the above embodiment, the importance degree setting section 92 includes the five scale lines for the importance degrees of 100% display, +10% display, +20% display, +30% display and the blank-out degree, so that the thumbnail 93 is enlarged the more the higher importance degree is set to the contained keyword information 58 in the corresponding still image file 54. However, the present invention is not limited to this embodiment, but another configuration is applicable to the importance degree setting section.

Figure 12:
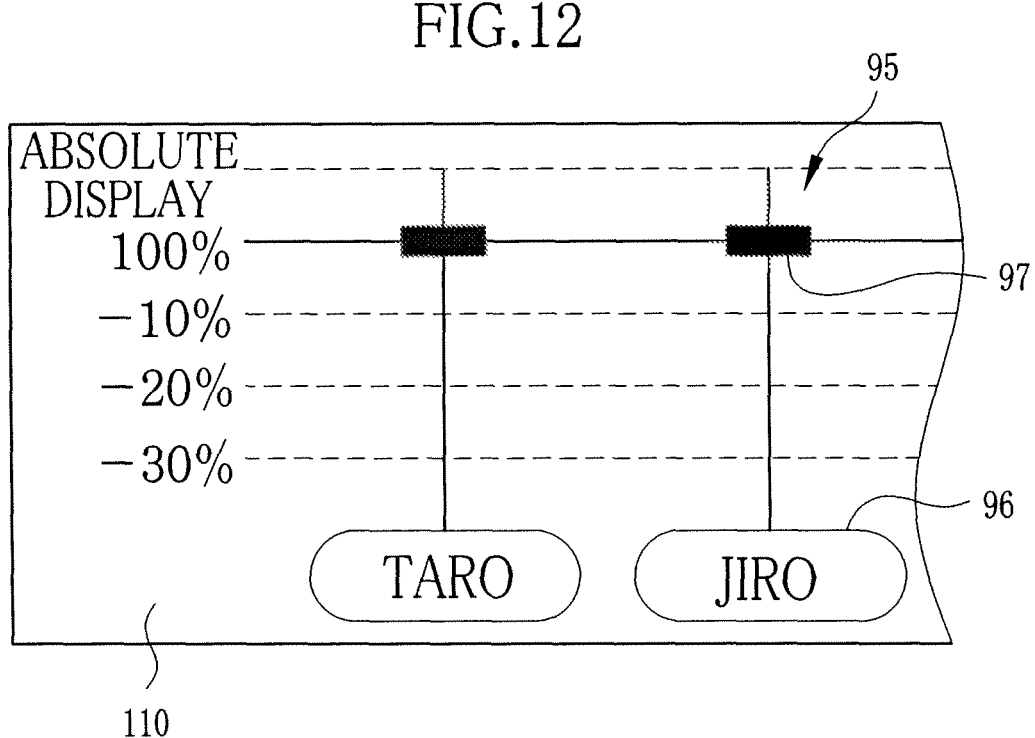
FIG. 12 is an explanatory diagram illustrating an alternative importance degree setting section, wherein the importance degree can vary in a direction to reduce the image size.

In an embodiment, as shown in FIG. 12, an importance degree setting section 110 is provided with five scale lines for importance degrees of 100% display, −10% display, −20% display, −30% display and absolute display. Among these scale lines, the −30% display line represents the lowest importance degree, and the −20% display, −10% display, 100% display and absolute display lines are arranged in the order of increasing importance.

Like the above embodiment, the 100% display line is for instructing the CPU 34 to display the thumbnail 93 in a 100% standard size. The −10% display, −20% display and −30% display lines are for instructing the CPU 34 to display the thumbnails 93 in the reduced sizes: 90%, 80% and 70% of the standard sizes respectively. The absolute display line is for instructing the CPU 34 to display the thumbnail 93 in the 100% size, preferentially over the importance degrees of other keywords.

Thus, it is possible to provide such scale lines that set the importance of the individual keywords to lower degrees than the standard degree corresponding to the 100% display, so that the image size of thumbnails 93 may be reduced from the 100% size as the importance of the keyword information 58 contained in the corresponding still image files 54 is set to the lower degree.

In a case where one still image file 54 stores two or more keywords, an image size decider 66 of this embodiment sums up the percentages of reductions from 100% of the image size, which are assigned as the importance degrees to the respective keywords, to display the thumbnail 93 of the corresponding still image file 54 in a size reduced by the total percentage from the standard size.

For example, in one still image file 54 storing three keywords "Taro", "Jiro" and "Field day" as the keyword information 58, the keyword "Taro" may be set at the importance degree of −30% display, the keyword "Jiro" at the importance degree of −20% display, and the keyword "Field day" at the importance degree of 100% display. In that case, the total percentage of reduction from the 100% image size is (−30%–20%–0%)=−50%, so that the image size decider 66 decides to reduce the thumbnail of that still image file by 50% from the standard or 100% size. That is, the corresponding thumbnail is decided to be displayed in 50% size compared to the standard size.

If any of the keywords contained in the keyword information 58 of one still image file 54 is set at the degree of absolute display, the image size decider 66 gives preference to the degree of absolute display and decides to display the thumbnail 93 of the one still image file 54 in the 100% size, even while another keyword assigned to the same still image file 54 is set at the lower importance degree for reducing the thumbnail image size. Instead of the preferential display in the 100% size, it is possible to display the thumbnail 93 in an enhanced manner, e.g. by blinking margins of the thumbnail 93, if the importance of any associated keyword is set at the degree of absolute display.

Figure 13:
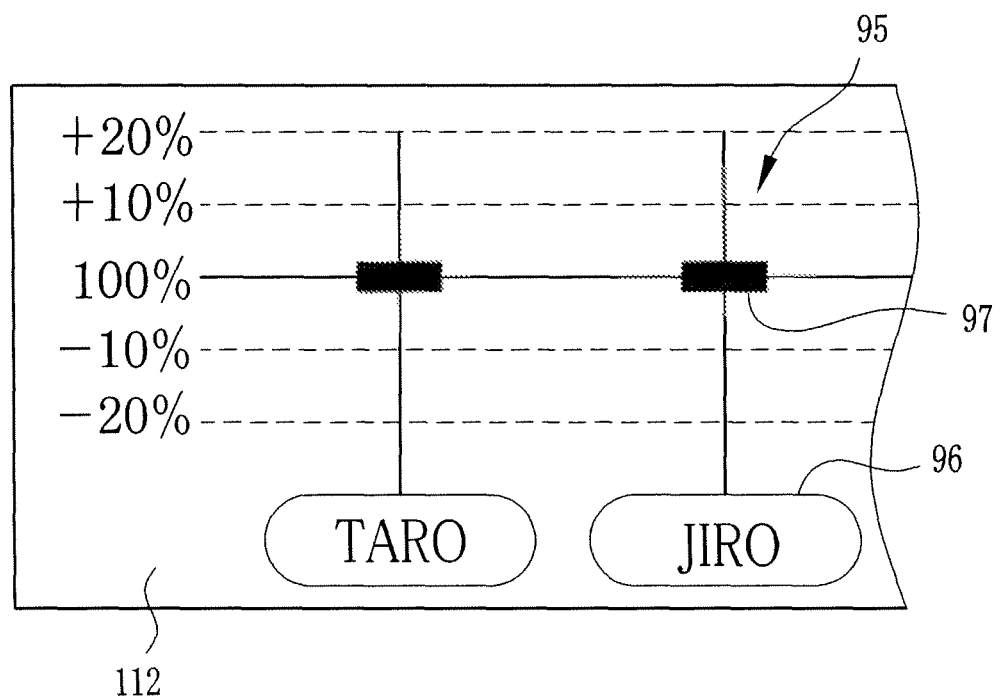
FIG. 13 is an explanatory diagram illustrating another importance degree setting section, wherein the importance degree can vary in both directions to reduce or enlarge the image size.

In an alternative embodiment, as shown in FIG. 13, an importance degree setting section 112 is provided with five scale lines for importance degrees of −20% display, −10% display, 100% display, +10% display and +20% display, so that the image size of the thumbnail 93 may be enlarged or reduced according to the importance degree of the keyword information 58 of corresponding still image file 54. According to this embodiment, if one still image file 54 contains more than one keyword as the keyword information 58, an image size decider 66 sums up the percentages of variations from the 100% size, which are assigned to the respective keywords as the importance degrees, to enlarge or reduce the image size of the corresponding thumbnail 93 by the total percentage from the 100% size.

For example, in one still image file 54 storing three keywords "Taro", "Jiro" and "Field day" as the keyword information 58, the importance of the keyword "Taro" may be set at the degree of +20% display, and the importance of the keyword "Jiro" may be set at the degree of 100% display, whereas the importance of the keyword "Field day" may be set at the degree of −10% display. In that case, the total percentage of variation from the 100% image size is (+20%+0%–10%)=+10%, so that the image size decider 66 decides to display the thumbnail of that still image file in 110% size that is enlarged by 10% from the 100% size.

Although the operating members 95 are depicted as slide bar type GUI in the above embodiments, the present invention is not limited to these embodiments. For example, as shown in FIG. 14, operating members for setting the importance degrees of the respective keywords may be configured as checkbox type GUI.

Figure 14:
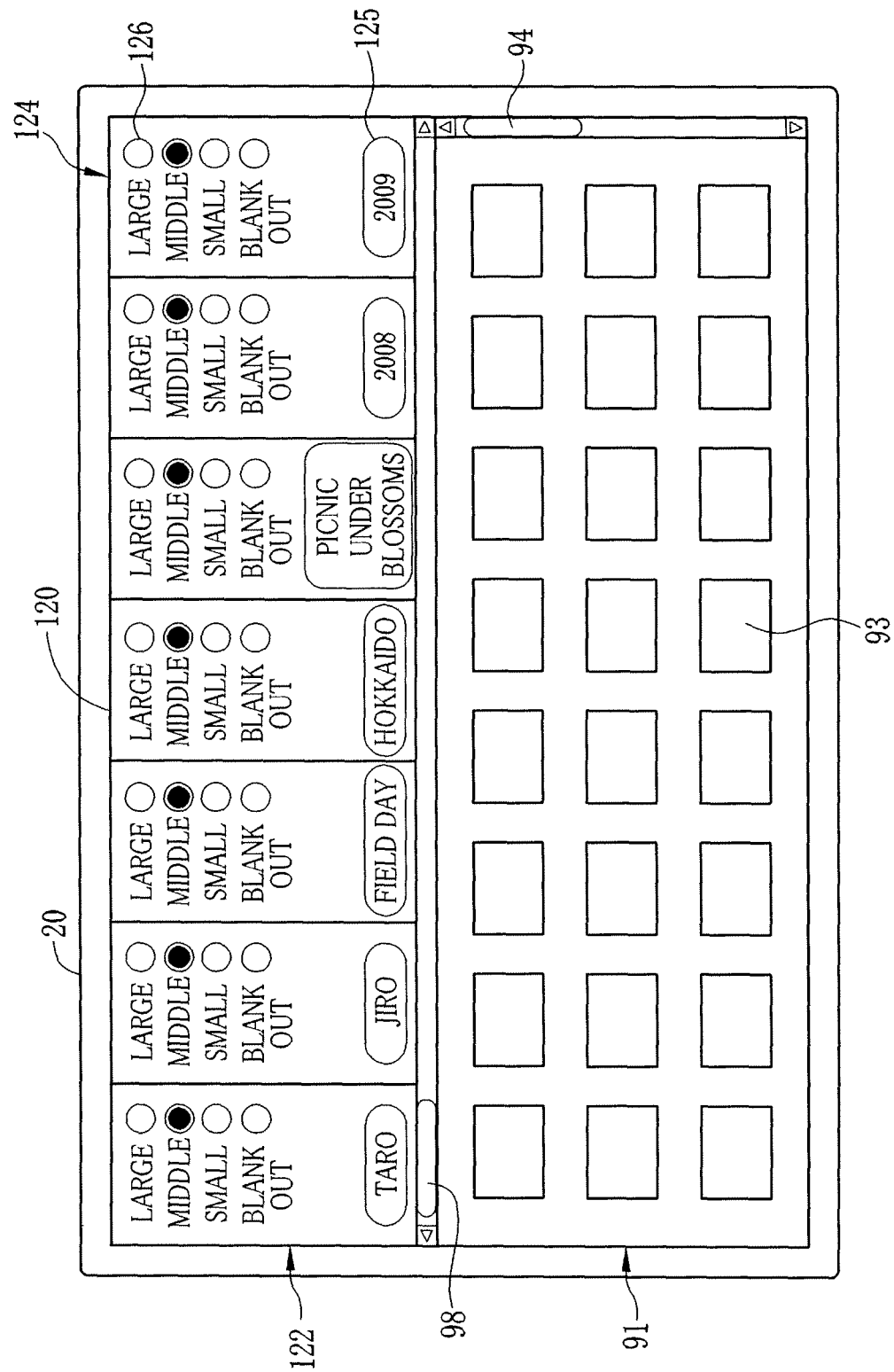
FIG. 14 is an explanatory diagram illustrating an importance degree setting section according to another embodiment, wherein operating members for setting the importance degree of each keyword are configured as checkbox type graphical user interface.

On a thumbnail display screen 120 of FIG. 14, an importance degree setting section 122 includes a plurality of operating members 124, each of which includes a tag 125 indicating a keyword as a character string, and checkboxes 126 corresponding to several degrees of importance selectable for the keyword in the tag 125. The keywords indicated in the tags 125 of the respective operating members 124 correspond to the keywords contained in the keyword information 58 of all still image files 54 stored in the memory card 52.

In this importance degree setting section 122, the user can set the importance of each keyword at an appropriate one of the selectable degrees by touching on the corresponding checkbox 126 in the corresponding operating member 124. When one of the checkboxes 126 is touched, a check mark, like a black dot in FIG. 14, is displayed in the touched checkbox 126, showing that importance of the corresponding keyword is set at the degree corresponding to the touched checkbox 126. Note that the operating members for setting the importance degrees of the respective keywords are not limited to the above embodiments, but may have any configuration that allows setting the importance degree.

In the above described embodiment, all operating members 9 which respectively correspond to all keywords retrieved from all still image files 54 in the memory card 52 are arranged in a line in the importance degree setting section 92. In another embodiment, as shown in FIG. 15, operating members 95 may be sorted into several groups according to the corresponding keywords, and displayed one group after another in an importance degree setting section 132 on a thumbnail display screen 130. A tag 133 is attached to each group, to indicate the classification or title of the group, and the tags 133 for the respective groups are displayed in the importance degree setting section 132. When the user touches on one of the tags 133, the operating members 95 of the group indicated by the touched tag are displayed in the importance degree setting section 132.

In this embodiment, the keywords are individually classified when written as keyword information in the still image files. For example, as shown in FIG. 16, a class setting section 142 for sorting each keyword into a class may be provided on a keyword input screen 140. Thus the written keyword information 58 has a hierarchic structure consisting of "class"-"keyword". In the illustrated embodiment, the class setting section 142 are provided with checkboxes 144 so that the user may sort the keywords by checking on one of the checkboxes 144. However, the class setting section 142 is not limited to this embodiment, but may have any configuration insofar as it allows the classification of the keywords written as the keyword information 58. The hierarchic structure of the keyword information 58 is not to be limited to two-layered structure, but the keyword information may be classified in more detail, such as "broader category"-"narrower category"-"detailed keyword".

In the above embodiment, the LCD display 20 has the touch panel 24 on its front so that the user can input the keyword information 58 by touching on the keys and buttons displayed on the LCD display 20. However, the present invention is not limited to this embodiment. For example, an operating member like a cursor shift key may be provided on the camera body 4 so that the user may input the keyword information 58 by operating the cursor shift key. It is also possible to make the camera body 4 connectable to an input member like a mouse or keyboard, so that the user may input the keyword information 58 by operating the mouse or keyboard. Although the above embodiment has been described on the assumption that the keyword information 58 is written in the still image file 54 through operations on the digital camera 2, the keyword information 58 may be entered using an external device such as a personal computer or other external equipments.

Moreover, in the above embodiment, the digital camera 2 automatically detects and records the time and date of shooting as one kind of keyword information 58 in each still image file, whereas other keywords may be manually input as the keyword information 58. However, the present invention is not limited to this configuration. For example, the digital camera 2 may automatically identify the human subject by means of a well-known face recognition technique, to record the name of the identified subject as the keyword information 58. The digital camera 2 may automatically classify the captured image into a category by means of a well-known scene recognition technique, to record the category of the image as the keyword information 58. In order to record the name of the human subject automatically as the keyword information 58, table data correlating particular persons' faces to their names should be previously memorized in the digital camera 2. Instead of the name data, it is alternatively possible to memorize image data of particular person's faces as the keyword information 58.

Although the above embodiment maintains the sequence of arrangement of the thumbnails 93 on the thumbnail display screen 90 even after the thumbnail display screen 90 is revised to change the image sizes of the thumbnails 93, while displaying the icons 100 in place of the blanked thumbnails 93, the present invention is not limited to this embodiment. For example, the thumbnails 93 may be rearranged in the order from largest to smallest.

Although the thumbnail display section 91 and the importance degree setting section 92 are displayed on the same screen in the above embodiment, they may be displayed individually on different screens that are switchable to one another.

In the above embodiment, the thumbnails 93 of the still image files 54 are initially displayed in the 100% standard size when the thumbnail display button 76 is touched to give the instruction for displaying thumbnails. However, the present invention is not limited to this embodiment. For example, it may be possible to store the importance degrees previously set to the respective keywords, to display the thumbnails 93 in variable sizes according to the stored importance degrees of the respective keywords.

Although the above embodiments have been described with respect to displaying thumbnails of those still image files 54 which are stored in the memory card 52 that is removably loaded in the camera body 4, the present invention is applicable for displaying thumbnails of still image files stored in a storage medium built in the camera body 4, and is also applicable for displaying thumbnails of those still image files which are read from an external server or the like through a network.

In the above embodiment, when the thumbnail display button 76 is touched, every keyword contained as the keyword information 58 is read out from the Meta data storage segments 56 of all still image files 54 stored in the memory card 52, to produce the operating members 95 for all of these keywords. However, it is not always necessary to read out all of the stored keywords from the still image files. In an alternative embodiment, keywords may be ranked before being written as the keyword information 58 in the Meta data storage segment 56. In response to an instruction to display thumbnails, merely a predetermined number of keywords are read out from the Meta data storage segment 56 in the order from highest ranking. Thus, the maximum number of operating members 95 may be limited to the predetermined number even while there are an excessive number of keywords in the Meta data storage segments 56. As a result, the operability of the importance degree setting section 92 will be improved. Note that the maximum number of keywords to be read out for setting their importance degrees may preferably be decided by the user.

Although the keyword information 58 is stored as a kind of Meta data in the still image file 54 in the above embodiment, the present invention is not limited to this, but it is alternatively possible to produce a table data file that correlates the image data 57 to the keyword information 58 so as to enable comprehensive management of all keywords assigned to the captured images.

Although the above embodiments have been described with respect to the cases of displaying thumbnails of still image files, the present invention is applicable to a case of displaying thumbnails of moving image files and still image files simultaneously, or thumbnails of moving image files alone. Note that a thumbnail of a moving image file may be produced from a designated one of many image frames constituting a moving image.

Although the above embodiment refers to the digital camera 2 as the image display apparatus of the present invention, the present invention is applicable to another image display apparatus such as a digital photo frame or a personal computer.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image display apparatus, comprising:
a display device for displaying images based on image data, said image data being stored for each image in an association with at least a keyword relating to said each image;
an importance degree setting controller for producing and displaying an importance degree setting section on said display device, to permit setting each keyword associated with said stored image data at an appropriate importance degree;
a thumbnail display controller for producing thumbnails of stored images and displaying the thumbnails in an order of a time and a date when said stored images are captured on said display device, said thumbnail display controller controlling displaying the thumbnails in variable sizes according to the importance degrees of respective keywords set through said importance degree setting section, and wherein, before sizes of the thumbnails are changed to said variable sizes according to the importance degrees of respective keywords, the thumbnails are displayed in a same size on said display device in the order of the time and the date when said stored images are captured.

2. An image display apparatus as recited in claim 1, wherein a different image size is previously assigned to each of the importance degrees available for setting through said importance degree setting section, and said importance degree setting controller comprises an image size decider that decides an image size of the thumbnail of each image according to the importance degree set to said at least the keyword of said each image, and
wherein said thumbnail display controller produces each thumbnail in the image size decided by said image size decider.

3. An image display apparatus as recited in claim 2, wherein said image size decider decides a magnification to a given standard size as the image size of each thumbnail, and if two or more keywords are related to one image, said image size decider decides the magnification of a thumbnail of said one image based on a sum of variations in respective image sizes from said standard size, which are assigned to respective importance degrees of said two or more keywords.

4. An image display apparatus as recited in claim 2, wherein the importance degrees set through said importance degree setting section include a specific one for blanking out the thumbnail, and
wherein said image size decider gives priority to said specific degree over others such that the thumbnail of one image is not displayed if any of the keywords associated with said one image is set at said specific degree for blanking out, regardless of the importance degrees set to other keywords of said one image.

5. An image display apparatus as recited in claim 2, wherein the importance degrees set through said importance degree setting section include a specific one for fixing a thumbnail in a predetermined size, and
wherein said image size decider gives priority to said specific degree over others such that a thumbnail of one image is displayed in the predetermined size if any of the keywords associated with said one image is set at said specific importance degree, regardless of the importance degrees set to other keywords of said one image.

6. An image display apparatus as recited in claim 2, wherein the importance degrees set through said importance degree setting section include a specific one for blanking out the thumbnail, and
wherein, if said at least a keyword associated with one image is set at said specific degree for blanking out, said image size decider decides to display an icon smaller than the thumbnails in place of the thumbnail of said one image.

7. An image display apparatus as recited in claim 1, wherein said importance degree setting controller acquires every keyword associated with the stored images to provide operating members each for a different keyword in said importance degree setting section, said operating members being arranged in an order from most frequent keyword among those associated with the stored images.

8. An image display apparatus as recited in claim 1, wherein said importance degree setting controller acquires every keyword associated with the stored images to provide operating members each for a different keyword, sorts said operating members into groups according to categories of corresponding keywords, and displays said operating members group by group in said importance degree setting section.

9. An image display apparatus as recited in claim 1, wherein said importance degree setting controller controls said display device to display said importance degree setting section on a same screen as the thumbnails.

10. An image display apparatus as recited in claim 1, further comprising a keyword input device for inputting said at least a keyword to be stored in an association with each image.

11. An image display apparatus as recited in claim 1, wherein said image data is stored for each image in an image data storage segment of a file, and said file includes a Meta data storage segment that stores keyword information containing said at least the keyword relating to said each image, and wherein said importance degree setting controller reads out said keyword information from said files to produce said importance degree setting section.

12. An image display method for producing thumbnails of images stored as image data, said method comprising:
   storing said image data of each image in a data file in an association with keyword information containing at least a keyword relating to said each image;
   reading out said keyword information from said data files;
   producing and displaying an importance degree setting section on a display device based on said keyword information read from said data files;
   setting each of the keywords contained in said keyword information at an appropriate importance degree through said importance degree setting section; and
   controlling said display device to produce the thumbnails of the images stored, in an order of a time and a date when said images stored are captured, said controlling said display device controlling displaying the thumbnails of the images stored in variable sizes according to the importance degrees of respective keywords set through said importance degree setting section, and wherein, before sizes of the thumbnails are changed to said variable sizes according to the importance degrees of respective keywords, the thumbnails are displayed in a same size on said display device in the order of the time and the date when said stored images are captured.

* * * * *